(12) United States Patent
Liu et al.

(10) Patent No.: US 8,615,940 B2
(45) Date of Patent: Dec. 31, 2013

(54) ENERGY INTEGRATIVE BUILDING WITH ECOLOGICAL ENVIRONMENTAL PROTECTION

(76) Inventors: Xudong Liu, Wenzhou (CN); Geng Liu, Wenzhou (CN); Ziyan Liu, Wenzhou (CN)

( * ) Notice: Subject to any disclaimer, the term of this patent is extended or adjusted under 35 U.S.C. 154(b) by 0 days.

(21) Appl. No.: 13/505,038

(22) PCT Filed: Sep. 30, 2010

(86) PCT No.: PCT/CN2010/001542
§ 371 (c)(1),
(2), (4) Date: Apr. 30, 2012

(87) PCT Pub. No.: WO2012/031376
PCT Pub. Date: Mar. 15, 2012

(65) Prior Publication Data
US 2012/0216468 A1    Aug. 30, 2012

(30) Foreign Application Priority Data
Sep. 8, 2010   (CN) .......................... 2010 1 0275707

(51) Int. Cl.
*E04D 13/18*   (2006.01)
(52) U.S. Cl.
USPC ........................................ 52/173.3; 52/573.1
(58) Field of Classification Search
USPC ........................................ 52/173.3, 1, 573.1
See application file for complete search history.

(56) References Cited

U.S. PATENT DOCUMENTS

| | | | | |
|---|---|---|---|---|
| 4,481,774 A | * | 11/1984 | Snook | .......................... 60/641.14 |
| 2003/0177705 A1 | * | 9/2003 | Forbis et al. | .......................... 52/3 |
| 2005/0138867 A1 | * | 6/2005 | Zhao | .......................... 52/79.1 |
| 2006/0272207 A1 | * | 12/2006 | Nomura et al. | .......................... 47/65.9 |
| 2009/0271336 A1 | * | 10/2009 | Franks | .......................... 705/500 |

FOREIGN PATENT DOCUMENTS

| | | |
|---|---|---|
| CN | 2292852 | 9/1998 |
| CN | 1478972 | 3/2004 |
| CN | 2871678 | 2/2007 |
| CN | 201125542 | 10/2008 |
| JP | 2000104227 | 4/2000 |

OTHER PUBLICATIONS

International Search Report for international application No. PCT/CN2010/001542, dated Jun. 16, 2011 (6 pages).

* cited by examiner

*Primary Examiner* — Basil Katcheves
(74) *Attorney, Agent, or Firm* — Hamre, Schumann, Mueller & Larson, P.C.

(57) ABSTRACT

An eco-friendly energy integrated building comprises a building frame, doors and windows, a roof and guard rails. A concrete reinforced layer is poured on the roof, a farm soil layer is arranged on the concrete reinforced layer, farm crops are planted on the farm soil layer, a power generation system is arranged on the concrete reinforced layer, and a solar energy device is arranged on the guard rails.

8 Claims, 9 Drawing Sheets

ENERGY INTEGRATIVE BUILDING WITH ECOLOGICAL ENVIRONMENTAL PROTECTION

TECHNOLOGICAL FIELD OF THIS INVENTION

This invention belongs to the field of buildings and gets involved in a kind of Energy Integrative Building with Ecological Environmental Protection.

TECHNOLOGICAL BACKGROUND OF THIS INVENTION

Nowadays, most of the land resources are taken over for use in the coastlands which are developed areas in China, farmers' homesteads are put together and then are plotted out, now these areas are carrying out the plan of living in high buildings, but there is not very high technology content of traditional architectural layout in villages, it is not good for the multipurpose use of ecological environmental protection.

In the southern Chinese village, the farmlands are being decreased, and the climatic situation becomes worse due to the lower technology content of traditional architectural layout in their construction, what's more, on the one hand the means of traditional cultivation fall behind, many farmlands have been wasted for eight years, on the other hand the mankind is facing the trouble of serious shortage in resources such as energy, plough, drought, waterlog and short water sources.

There are problems in buildings of cities and towns such as the outdated design concept, the single function, at the same time, the mankind is also confronted with the dilemma, in which demand is more than supply for natural gas, liquefied gas and electric power, and it is not enough for utilization in methane, solar energy and geothermal energy. Since the unrenewable resources are becoming little and little that brings about the bad hurt for the earth, mankind has to build up a reasonable and suitable environment for life, so that we can achieve our country's aim: low carbon life in environmentally friendly.

DESCRIPTION OF THIS INVENTION

The purpose of this invention is to supply one kind of high-tech Energy Integrative Building with Ecological Environmental Protection which adopts the integrative design of new technology and energy, so that it can not only generate electricity, but also grow crops on the top of building. In this way it increases per capita living area, and improves the relationships between human and land, and human and the natural environment.

The technical scheme of this invention is: one kind of Energy Integrative Building with Ecological Environmental Protection, which includes the overall structure of building, doors and windows, and guardrails, there is also the concrete strengthened layer which is casted on the top of building.

The fertile layer of farmland which is set on the concrete strengthened layer mentioned above can grow crops.

The equipment which generates electricity is installed on the concrete strengthened layer mentioned above.

The solar energy equipment is installed on the guardrails mentioned above.

The decorative plates with heat preservation are installed on the inside walls of building overall structure mentioned above.

The air layer is set on the concrete strengthened layer mentioned above.

The overall structure of building mentioned above appears in the circular structure, the concrete strengthened layer is casted on the middle of the circular building roof, and there are guardrails, aprons and enclosures around the outside building overall structure on it.

The energy source of generated electricity equipment mentioned above is the water energy from wind and rain, there is drawer which is utilized to keep water in reserve, can be folded, assembled and disassembled is set on the blade-end of wind impeller, on which lock cogs are set, below which the flume is set, the water receiving end of flume and the blade of wind impeller are set on the same level; there is the spherical spiale which is set on the top of the pillar, on which there is the spring steel lever matched with the spherical groove, both ends of the lever are all connected with the spherical targeted movable joint, among them, one of ends links the backwater tank, the other of ends links the reservoir-water tank, the two water tanks and the blade of the wind impeller also are set on the same level, the blade of the wind impeller consists of the vacuum concave groove of vitreous steel. There is the backwater groove set below the reservoir-water tank mentioned, in which there is the hold-water plate on its inner bottom, in which the bottom is connected with the outlet-water pin-lift, which links the backwater groove, in which the water flows in the backwater tank; the generator and the wind impeller are set on the top of the upright pillar, the generator couples gears, hydraulic units or electric control devices, or links the power grid access.

The solar energy equipment mentioned above belongs to the rotational solar device of lifting mode, in which the solar panel frame is the square parallelepiped or rectangular parallelepiped frame with beam and stringer joined by the hollow stainless steel in structural section, the vitreous solar panels are installed on the front part of solar device, the solar backplane is made of the synthetic resin viscose glued the black sands that is set on the back part of solar device, the movable crown plate is installed on the solar backplane and joins the lifting rotational device through the hinge, the lifting rotational device mentioned above adopts and connects an oil pump jack through a electric motor, the top of the jack joins the movable crown plate by a hinge of steel panel;

Hydraulic lifting device is selected by the lifting rotational device mentioned above, in which the electric motor connects with the hydraulic pump, which connects with the telescopic pole, which connects with the movable crown plate by the hinge of steel panel.

The decorative plate with heat preservation mentioned above belongs to the temperature-controlled decorative plate with environmental protection, the faceplate is set on the surface of diffuse temperature layer, the faceplate surface has the decorative net veins, the backplane is set on the surface of heat preservation layer, the sound-absorbing lines and fixed pawl nails are set on the surface of backplane; the diaphragm links the diffuse temperature layer and the heat preservation layer that form an enclosed cavum with the water and air penetrating groove and draining groove, there are the sealing components and pipe of temperature controller, among them, the water and air penetrating groove connects the interface joint of water and air penetrating valve, the water and air draining groove connects the interface joint of water and air draining valve, and both joints link the water and air supply pipelines respectively.

ACTIVE AND BENEFICIAL EFFECTS OF THIS INVENTION

1. The building engineering adopts the integrative design of new technology and energy, which solves the decreasing farmland problem due to construction, makes the abandoned and wasted farmlands become the qualified farmlands for growing crops; solves the loss problem of soil and water and fertile soil, makes per capita living area increase, and the living environment improve, in order to realize the living harmony between human and land, and human and the natural environment.

2. Cutting down the growing period of crop enlarges the food output.

3. The fertile soil is transferred on the top of building, the moist soil dries fast under the sunlight, the fertile elements are increased, the harmful bacteria and parasite are killed in the soil, so as to keep away from the infringement to the soil caused by mouse, mosquito and housefly.

4. The rotational solar device of lifting mode which is set on the top of building can not only generate electricity, but also take the role of protection within the growing periods of crops, which can prevent crops from harm of climatic situations such as of typhoon, hailstone and rainstorm. The large underground well pond is built in each building, guarantees the water supply for crops in drought, the planting crops all around year, and the adjusting function for the urban weather.

5. The hydraulic power from wind and rain is used for the generated electricity as the new energy source in the design of top building, there is the large storage battery in the building, which offers the electricity required by the building, reduces greatly the independent development cost from the generated electricity of wind power.

6. Manure required by crops on the top of building is all coming from the fermentation of dung and waste material caused by hygienism and toilets, the delivering and fertilizing manure is conducted by the enclosed pipelines. Methane is used as the burning energy, and the crops which are produced belong to the green and natural food.

7. The infrastructural design of ship-shape orbit mode is adopted by the building, resists the nine-grade earthquake, which can reduce the destructive loss owing to the earthquake; the indoor temperature-controlled decorative panel with environmental protection has functions including diffuse heat, fireproofing, decoration, indoor heat or cool supply, which make people feel comfortable in every season.

8. The farmland on the top of building enlarges the ground space, so that the ground can also grow rice and fruit trees.

9. The planting area on the top of building can protect the natural environment and make the earth turn into the green sea in terms of the observation in the sky.

10. The special teams trained for planting farmland on the top of building can use the light intelligent electric seeding-machine to sow seeds, reap, irrigate automatically and fertilize, reduce largely the costs of fertilizer, insecticide and labor forces, and improve the agricultural current situation of low revenue.

11. Advanced monitoring and professional property managing system are adopted and installed to make sure owner's personal and possession safety, become the environmental protection and safe community, reduce the medical insurance expenses, and make people health and longevity.

12. The building has multifunction, overcomes the tight supplies for natural gas, liquefied gas and electric power, at the same time, that it is not enough for utilization in methane, solar energy and geothermal energy; the building decreases the development for the unrenewable resources, protects the earth from the bad hurt, creates the reasonable and sustainable survival environment for human, so as to achieve the low carbon life in environmentally friendly, develop the construction of cities and villages into the environmental protection park with new energy and new idea in $21^{st}$ and $22^{nd}$ centuries.

MEANS OF DETAILED IMPLEMENTATION

Example 1

Figure 1:
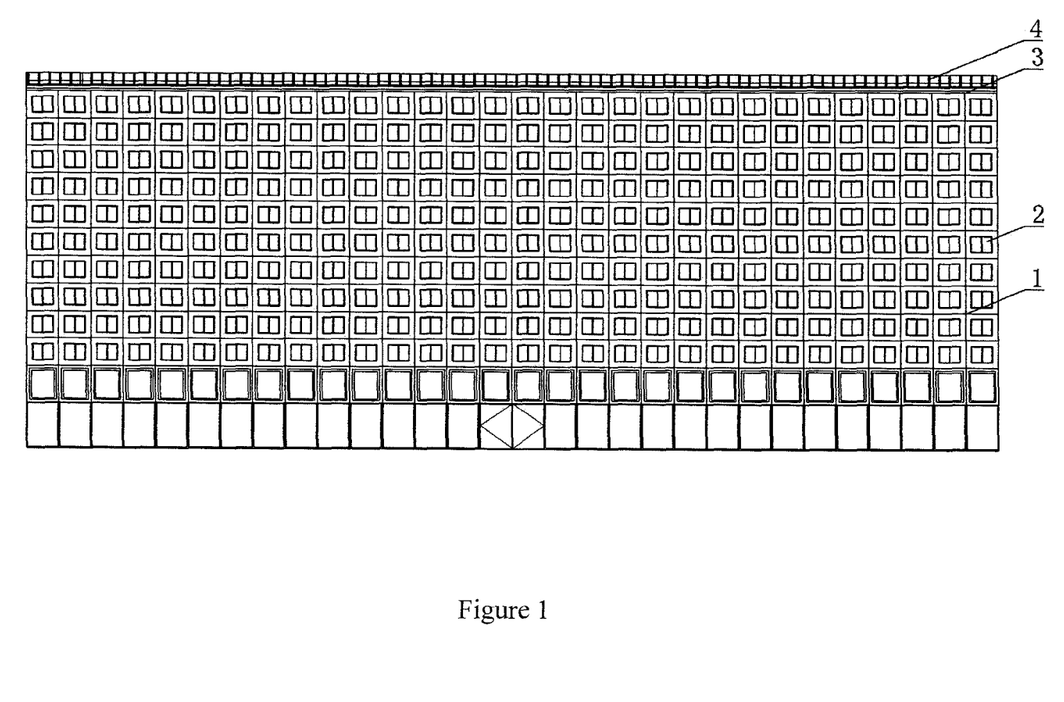
FIG. 1 Front View of Structural Diagram from Example 1 in This Invention.
Figure 2:
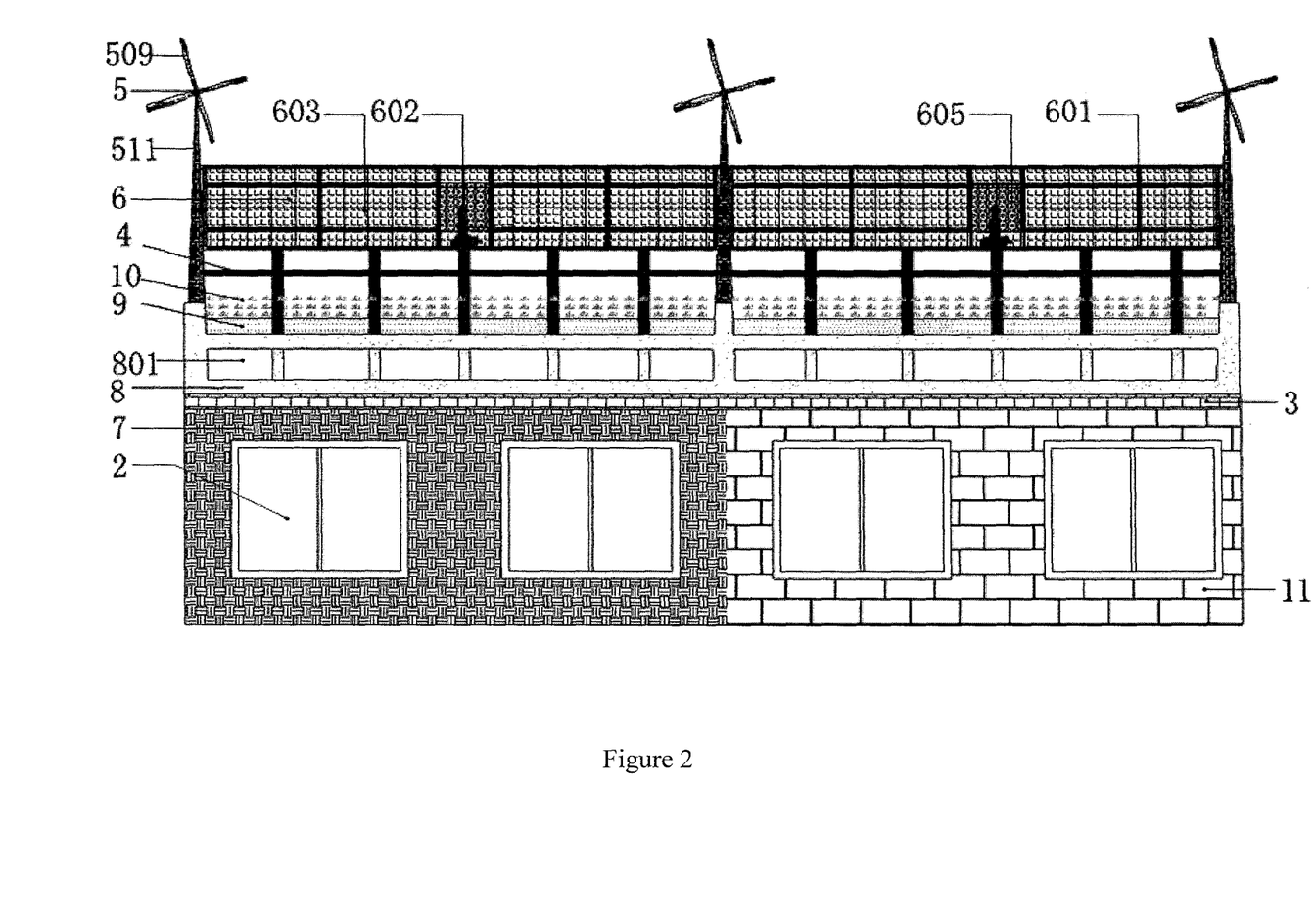
FIG. 2 Local Sectional View of Example 1.

FIGS. 1 and 2 are shown as the reference, an Energy Integrative Building with Ecological Environmental Protection includes mainly: overall structure of building 1, doors and windows 2, top of building 3, guardrails 4, equipment of generated electricity 5, solar device 6, decorative panels with heat preservation 7, concrete strengthened layer on the top of building 8, fertile layer of farmland 9, crops 10, outside wall 11, and so on; in which overall structure of building 1, doors and windows of the vitreous vacuum 2, top of building 3, and outside wall 11 all belong to the structure of current building, this invention is located in the top of building 3, in which there is the concrete strengthened layer 8 on the top of building with the air layer 801 casted, on which there are the fertile layer of farmland 9 and guardrails 4, crops 10 such as wheat and rice are cultivated on the fertile layer of farmland 9, the solar device 6 is installed in the guardrails 4, and the equipment of generated electricity 5 is installed in the concrete strengthened layer 8 on the top of building; the decorative panels with heat preservation 7 are set on the inside walls of building overall structure 1.

Example 2

Figure 3:
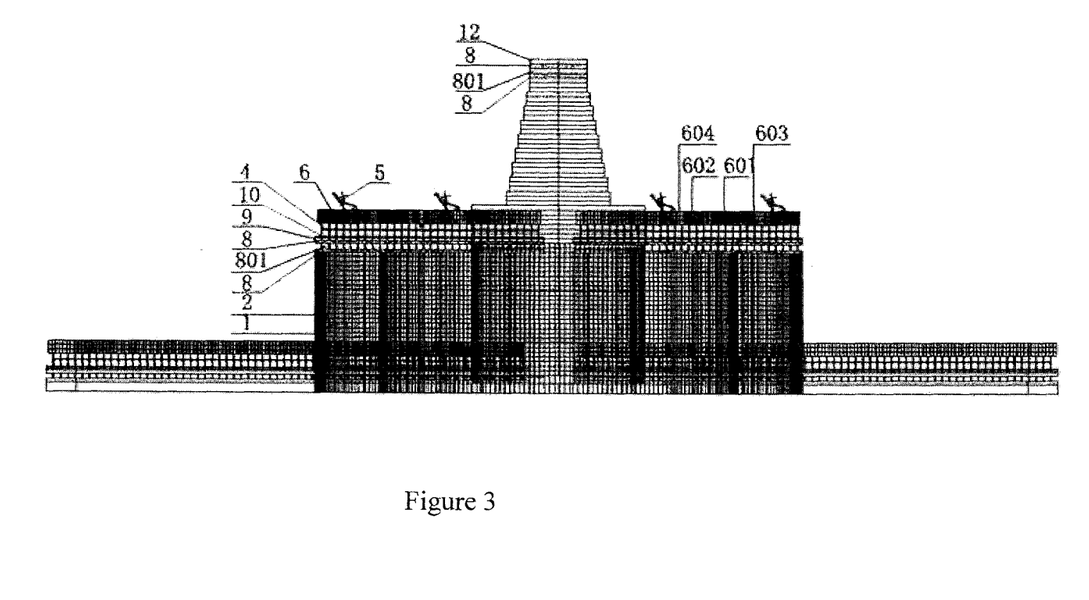
FIG. 3 Front View of Structural Diagram from Example 2 in This Invention.
Figure 4:
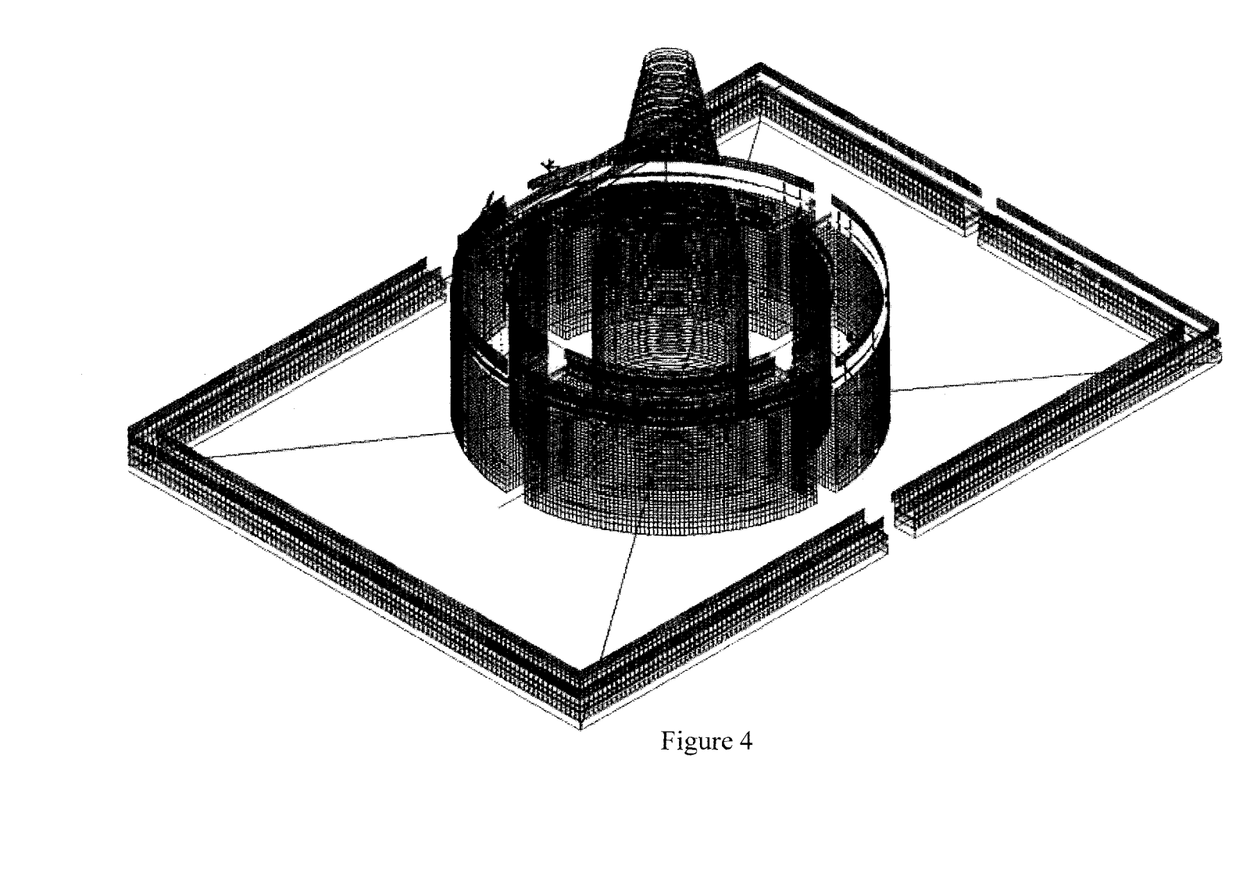
FIG. 4 Axonometric Diagram of Example 3.
Figure 5:
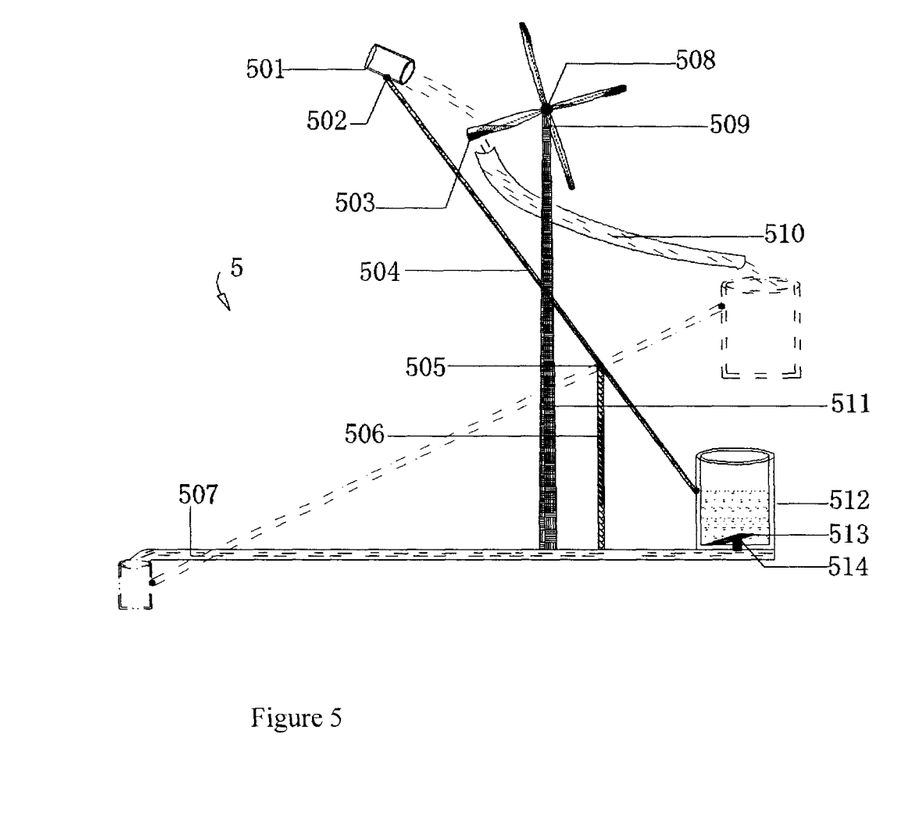
FIG. 5 Structural Diagram of Generated Electricity Equipment Driven by the Wind and Rainwater Energies.
Figures 6, 7:
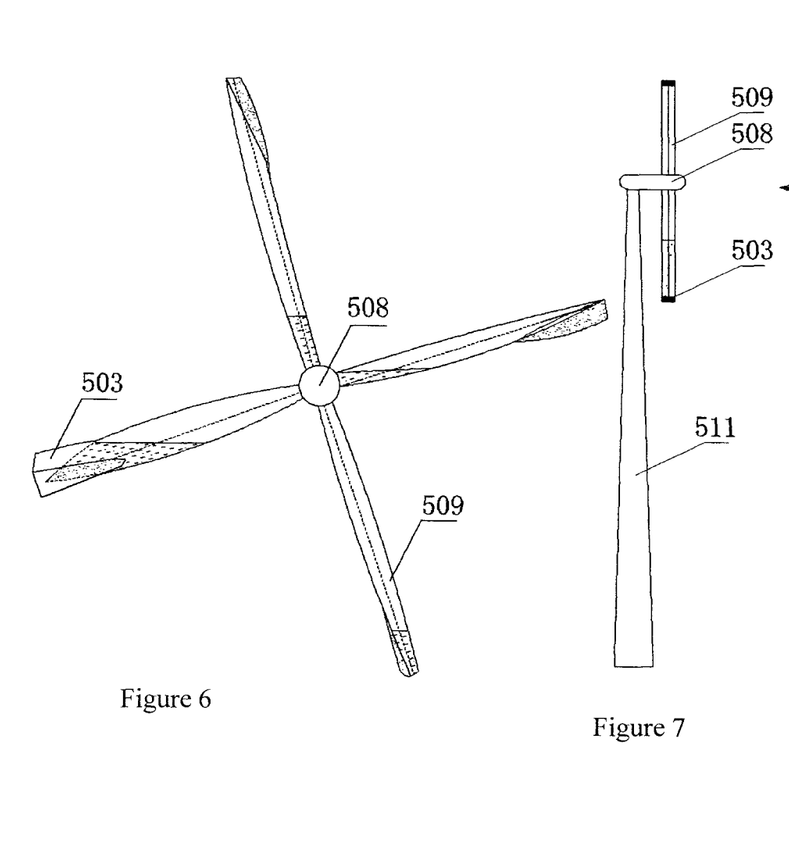
FIG. 6 Magnified Structural Diagram of Wind Impeller in FIG. 5.
FIG. 7 Structural Left View of Wind Impeller in FIG. 5.
Figure 8:
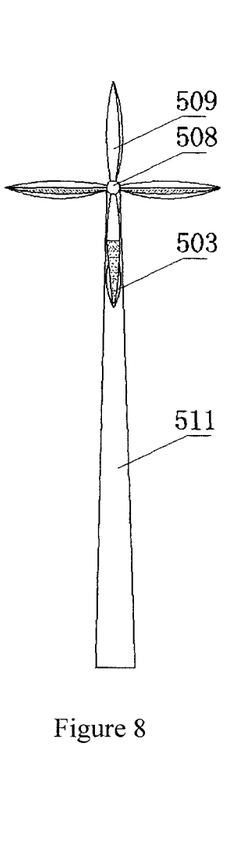
FIG. 8 Structural Front View of Wind Impeller in FIG. 5.
Figure 9:
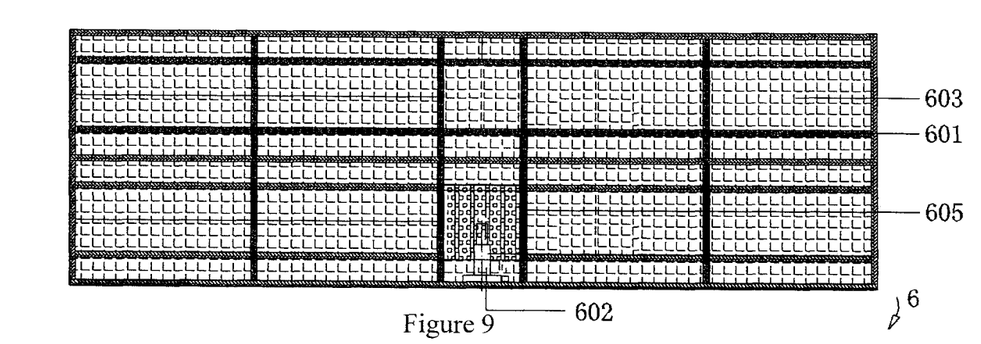
FIG. 9 Front View of Structural Diagram about the Rotational Solar Panel of Lifting Mode in This Invention.
Figure 10:
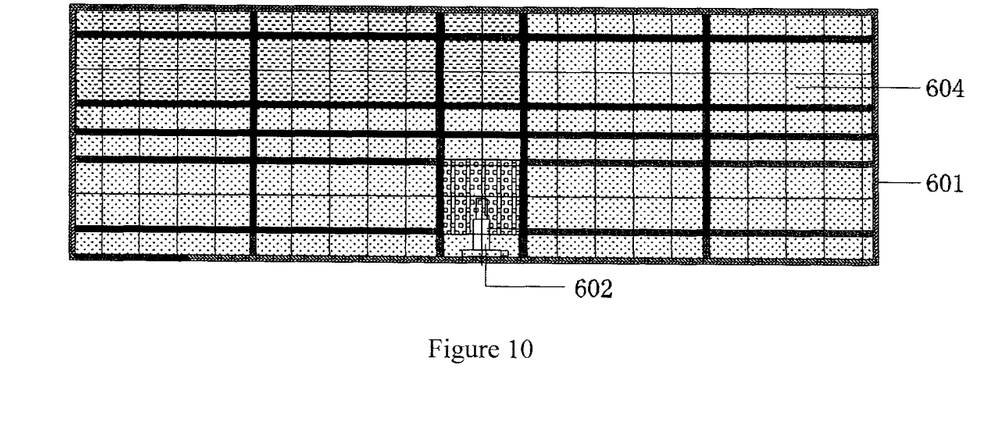
FIG. 10 Back View in FIG. 9.

FIGS. 3 and 4 are shown as the reference, the model of overall structure of building 1 mentioned above can be a circular structure, enclosure 13 is set around the outside of building overall structure 1, the concrete strengthened layer 8 with the air layer 801 is casted on the circular top of building 3 in the middle of building, there are guardrails 4 and apron 12 set on it; and the others structures are the same as example 1.

FIGS. 5,6,7,8 and 2 are shown as the reference; the equipment of generated electricity 5 mentioned above can use the hydraulic and wind-force electro-generating devices in the current technologies, or the generated electricity equipment is driven by the wind and rainwater energies in this invention. The equipment of generated electricity driven by the wind and rainwater energies 5 mentioned above includes mainly the backwater tank 501, spherical targeted movable joint 502, reservoir-water drawer 503, lever 504, spiale 505, pillar 506, backwater gutter 507, generator 508, wind impeller 509, flume 510, upright pillar 511, reservoir-water tank 512, hold-water plate 513, outlet-water pin-lift 514, and so forth; among them, the upright pillar 511 is made of the vitreous fiber resin materials, generator 508 is installed on the top of the upright pillar 511, the input shaft of generator 508 is set on the wind impeller 509, in which the blades are made from the vacuum material of vitreous steel, each blade appears in the concave groove, the reservoir-water drawer 503 is set on the blade-end, is made from the polyvinyl chloride, there are lock cogs in the inside wall, which are good for the firm connection between the reservoir-water drawer 503 and the blade, the reservoir-water drawer 503 can be assembled, disassembled and folded, the concave flume 510 of the polyvinyl chloride is set below the reservoir-water drawer 503, the water receiving end of flume 510 and the blade of wind impeller 509 are set on the same level; the spherical spiale 505 is installed on the top of the spring steel pillar 506, the spring steel lever 504 with the spherical groove matched is installed on the spiale 505, both ends of the lever 504 all are connected with the spherical targeted movable joint 502, among them, one of ends fixes and links the double-deck backwater tank 501 of stainless steel, the other of ends fixes and links the double-deck reservoir-water tank 512 of stainless steel, the two water tanks and the blade of the wind impeller 509 also are set on the same level, the backwater tank 501 and reservoir-water tank 512 could only conduct vertically the targeted up or down motion along the up or down motion of lever 504, rather than the random rotation, so as to make sure that when the backwater tank 501 goes up, its inside rainwater can pour into the reservoir-water drawer 503 and the vacuum blade in concave groove; the backwater gutter 507 is set under the reservoir-water tank 512, in which the hold-water plate 513 is set on its bottom, the bottom surface of hold-water plate 513 is connected with the hollow outlet-water pin-lift 514, which can be made of the steel pipe, and link the backwater groove 507, in which the water can flow in the backwater tank 501.

Generator 508, spherical targeted movable joint 502 and spherical spiale 505 mentioned above are all the current technology and can be bought as the finished products. The wind impeller 509 mentioned above has the standard series, which can match with all kinds of generators 508, so that generators 508 can match with and connect with gearing, hydraulic units, electric control devices, power grid accesses, and so on, the electrical energy and data that are generated by generators 508 can be transported into the console cabinets and transformer substation equipments, then delivered into the power grid, the indoor remote operation can be undertaken on the Internet that are shown as FIGS. 9, 10, 2 and 3. The solar device 6 mentioned above can use the solar device with current technology, or use the rotational solar device of hydraulic lifting mode in this invention. The rotational solar device of lifting mode 6 mentioned above includes mainly components and parts such as the solar panel frame 601, lifting rotational device 602, solar faceplate 603, solar backplane 604 and movable crown plate 605; among them, the solar panel frame 601 is welded into the square parallelepiped or rectangular parallelepiped frame with beam and stringer by the square hollow stainless steel, the vitreous solar faceplate 603 is installed on the front part of the solar panel frame 601, the solar backplane 604 is made of the synthetic resin viscose glued the black sands that is set on the back of solar panel frame 601, the movable crown plate 605 of stainless steel is installed in the middle of the solar backplane 604, both sides of movable crown plate 605 are located in the two adjoining stringers, the hinge of movable crown plate 605 joins with the lifting rotational device 602.

Figure 11:
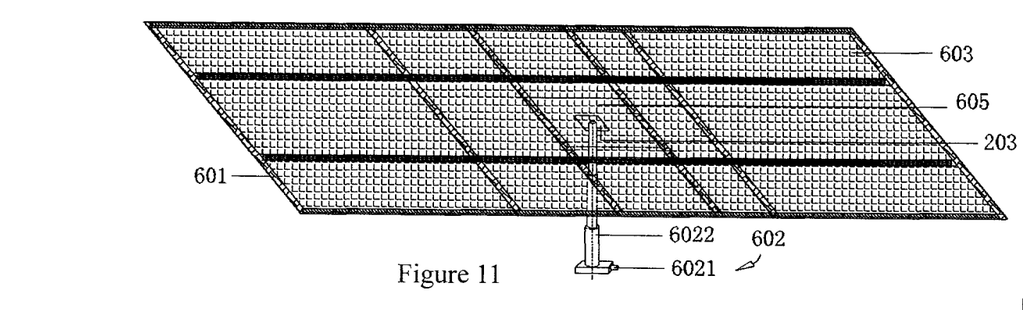
FIG. 11 Rotational State Diagram of Lifting Mode in FIG. 9.
Figure 12:
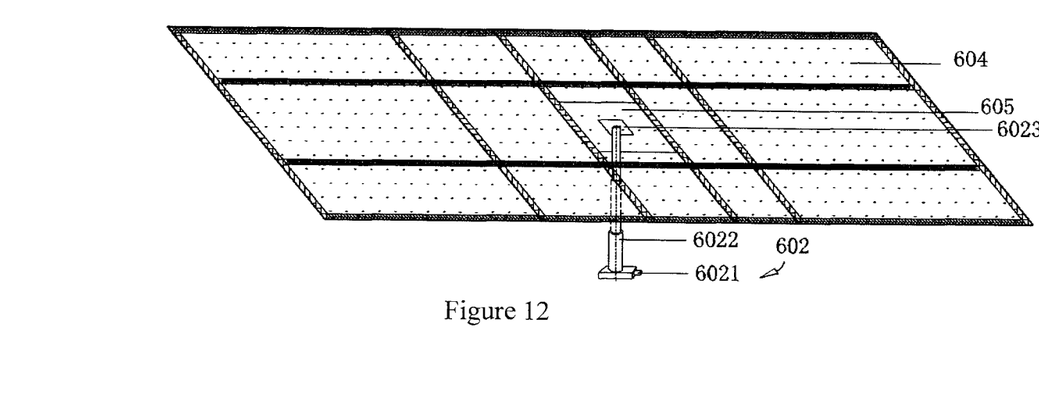
FIG. 12 Rotational State Diagram of Lifting Mode in FIG. 10.

FIGS. 11 and 12 are shown as the reference; the lifting rotational device 602 mentioned above can adopt an oil pump jack or hydraulic lifting device in the current technology, which can outsource.

The oil pump jack mentioned above includes the electric motor 6021, jack 6022, steel panel 6023, and so on; among them, the electric motor 6021 is connected with the oil pump jack 6022, in which on its top is connected with the movable crown plate 605 by the hinge of steel panel 6023, the movable crown plate 605 glides up and down along the middle frame groove of the solar panel frame 601, driving the solar panel to move up and down or reverse in a certain angle.

Figure 13:
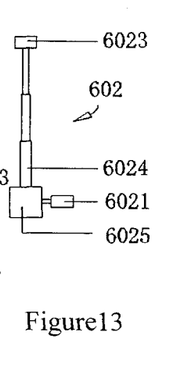
FIG. 13 Structural Diagram of Hydraulic Lifting Device about the Rotational Solar Panel of Lifting Mode in This Invention.
Figure 14:
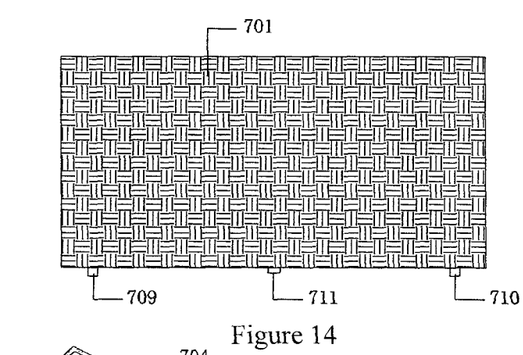
FIG. 14 Front View of Structural Diagram about the Temperature-Controlled Decorative Panel with Environmental Protection in This Invention.
Figure 15:
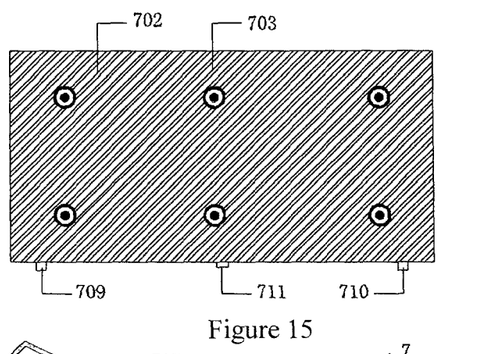
FIG. 15 Back View of FIG. 14.
Figure 16:
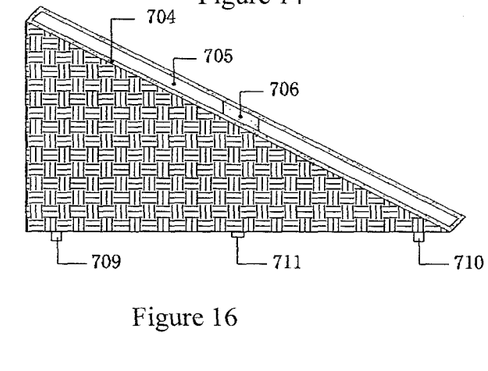
FIG. 16 Sectional View of FIG. 14.
Figure 17:
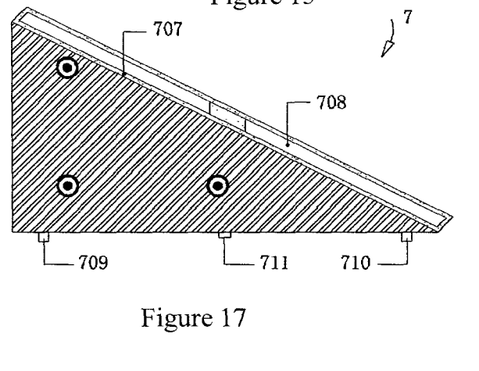
FIG. 17 Sectional View of FIG. 15.

FIG. 13 is shown as the reference; the hydraulic lifting device mentioned above includes the electric motor 6021, steel panel 6023, telescopic pole 6024, hydraulic pump 6025, and so on; among them, the electric motor 6021 connects with the hydraulic pump 6025, which connects with the telescopic pole 6024, which connects with the hinge of steel panel 6023, which connects with the movable crown plate 605, which drives the solar panel frame 601 to move up and down or reverse in a certain angle.

FIGS. 14, 15, 16, and 17 are shown as the reference; the decorative plate with heat preservation 7 mentioned above can choose the decorative plate with heat preservation in the existing technology, or use the indoor temperature-controlled decorative panel with environmental protection in this invention, the temperature-controlled decorative panel with environmental protection 7 mentioned above mainly includes faceplate 701, backplane 702, fixed pawl nail 703, diffuse temperature layer 704, water and air penetrating groove 705, diaphragm 706, heat preservation layer 707, water and air draining groove 708, interface joint of water and air penetrating valve 709, interface joint of water and air draining valve 710, pipe of temperature controller 711, seal components, and so forth; among them, the faceplate 701 is made of layered copper, iron and aluminum alloy, which is set on the surface of diffuse temperature layer 704, which is made from xalloy, the surface of faceplate 701 has the decorative net veins, which play the role of heat radiation, fireproofing and decoration; backplane 702 is made from the split and synthesis of iron resin fibers, and set on the surface of heat preservation layer 707, the surface of backplane 702 has the sound-absorbing lines which play the role of heat preservation and sound-absorption, the fixed pawl nail 703 is set on the backplane 702, is utilized to insert, join and fix on the grout of the building inside wall in installation.

The xalloy diaphragm 706 links the diffuse temperature layer 704 and the heat preservation layer 707 mentioned above that form an enclosed cavum with the water and air penetrating groove 705, and the water and air draining groove 708, furthermore the seal components and pipe of temperature controller 711 are set, there are the solar hot water or the chemical material solution within the cavum, where the temperature is controlled by the temperature controller combined with the underground well water; pipe of temperature controller 711 uses the existing technology or can be purchased; the water and air penetrating groove 705 links with the interface joint of water and air penetrating valve 709, the water and air draining groove 708 links with the interface joint of water and air draining valve 710, the interface joint of water and air penetrating valve 709 and the interface joint of water and air draining valve 710 mentioned above link the water and air supply pipelines of building respectively, which are suitable for water or gas heating and cooling. The heat preservation layer 707 mentioned above is made from the resin fiber by the thermal bonding and moulding.

The invention claimed is:

1. An energy integrative building with ecological environmental protection comprising:
   an overall structure of a building body, doors, windows, and guardrails,
   wherein a concrete strengthened layer is casted on a top of the building body,
   wherein decorative plates with heat preservation are installed on inside walls of the building body, and wherein:
   the decorative plates with heat preservation are a temperature-controlled decorative panel with environmental protection,
   the decorative plates include a faceplate, a diffuse temperature layer, a backplane, and a heat preservation layer,
   the faceplate is disposed on a surface of the diffuse temperature layer, a surface of the faceplate has decorative net veins,
   the backplane is disposed on a surface of the heat preservation layer, sound-absorbing lines and fixed pawl nails are provided on a surface of the backplane,
   a diaphragm links the diffuse temperature layer and the heat preservation layer to form an enclosed cavum with a water and air penetrating groove and a water and air draining groove,
   a sealing component and a pipe of temperature controller are provided for the decorative plates, and
   the water and air penetrating groove connects an interface joint of a water and air penetrating valve, the water and air draining groove connects an interface joint of a water and air draining valve, and the interface joints link water and air supply pipelines, respectively.

2. The energy integrative building with ecological environmental protection of claim 1, wherein a fertile layer of farmland is disposed on the concrete strengthened layer and is configured to grow crops.

3. The energy integrative building with ecological environmental protection of claim 2, wherein electric-power generation equipment is installed on the concrete strengthened layer.

4. The energy integrative building with ecological environmental protection of claim 3, wherein:
   the electric-power generation equipment is water-energy, wind-energy, and rain-energy equipment, the electric-power generation equipment includes a reservoir-water drawer which can be folded, assembled and disassembled, the reservoir-water drawer is disposed on a blade-end of a wind impeller, the reservoir-water drawer includes lock cogs thereon, a flume is installed bellow the reservoir-water drawer, a water receiving end of the flume and a blade of the wind impeller are disposed on the same level;
   a spherical spiale provided on a top of a first pillar, a spring steel lever is provided on the spherical spiale with a spherical groove to match the spherical spiale, each end of the spring steel lever is connected with a respective spherical targeted movable joint, one of the ends of the spring steel lever links a backwater tank, the other of the ends links a reservoir-water tank, the backwater and reservoir-water tanks and the blade of the wind impeller are disposed on the same level, the blade of the wind impeller consists of a vacuum concave groove of vitreous steel, a backwater groove is disposed below the reservoir-water tank, a hold-water plate is provided on an inner bottom of the reservoir-water tank, a bottom of the hold-water plate is connected with an outlet-water pin-lift that links the backwater groove, water in the backwater groove flows into the backwater tank; and
   a generator and the wind impeller are disposed on a top of a second, upright pillar, the generator couples gears, hydraulic units or electric control devices or a power grid access.

5. The energy integrative building with ecological environmental protection of claim 1, wherein solar energy equipment is installed on the guardrails.

6. The energy integrative building with ecological environmental protection of claim 5, wherein:
   the solar energy equipment is a rotational solar device of a lifting mode, a solar panel frame thereof is a square parallelepiped or rectangular parallelepiped frame with a beam and a stringer joined by hollow stainless steel in a structural section, vitreous solar panels are installed on a front part of the solar device, a solar backplane is made of a synthetic resin viscose glued with black sands and is disposed on a back part of the solar device, a movable crown plate is installed on the solar backplane and joins a lifting rotational device through a hinge, the lifting rotational device adopts and connects an oil pump jack through an electric motor, a top of the oil pump jack hingely joins the movable crown plate by a steel panel; and
   the lifting rotational device includes a hydraulic lifting device, in which the electric motor connects with a hydraulic pump, the hydraulic pump connects with a telescopic pole, the telescopic pole hingely connects with the movable crown plate by the steel panel.

7. The energy integrative building with ecological environmental protection of claim 1, wherein an air layer is provided on the concrete strengthened layer.

8. The energy integrative building with ecological environmental protection of claim 1, wherein the overall structure of the building body has a circular structure, the concrete strengthened layer is casted on a middle of a circular building roof of the building body, and is provided with the guardrails and aprons thereon, and enclosures are provided around an outside of the building body.

* * * * *